(12) United States Patent
Henkel et al.

(10) Patent No.: US 10,730,758 B2
(45) Date of Patent: Aug. 4, 2020

(54) EFFICIENT METHOD FOR DECONTAMINATING WASTE GASES AND WASTE WATER CONTAINING CYANIDE IN A METHOD FOR PRODUCING ALKALI METAL CYANIDES

(71) Applicant: EPC ENGINEERING & TECHNOLOGIES GMBH, Arnstadt (DE)

(72) Inventors: Jens Henkel, Meuselbach-Schwarzmühle (DE); Jürgen Rassbach, Arnstadt (DE); Klaus Trenkmann, Rudolstadt (DE)

(73) Assignee: EPC ENGINEERING & TECHNOLOGIES GMBH, Arnstadt (DE)

( * ) Notice: Subject to any disclaimer, the term of this patent is extended or adjusted under 35 U.S.C. 154(b) by 45 days.

(21) Appl. No.: 15/575,624

(22) PCT Filed: Jun. 8, 2016

(86) PCT No.: PCT/EP2016/062939
§ 371 (c)(1),
(2) Date: Nov. 20, 2017

(87) PCT Pub. No.: WO2016/202653
PCT Pub. Date: Dec. 22, 2016

(65) Prior Publication Data
US 2018/0155205 A1 Jun. 7, 2018

(30) Foreign Application Priority Data
Jun. 18, 2015 (DE) .......................... 10 2015 211 233

(51) Int. Cl.
*C01C 3/10* (2006.01)
*F23G 7/06* (2006.01)

(52) U.S. Cl.
CPC .................. *C01C 3/10* (2013.01); *F23G 7/06* (2013.01); *F23G 2202/101* (2013.01); *F23G 2209/14* (2013.01)

(58) Field of Classification Search
CPC ......... C01C 3/10; F23G 7/06; F23G 2209/14; F23G 2202/101
See application file for complete search history.

(56) References Cited

U.S. PATENT DOCUMENTS

| 2,993,754 | A | * | 7/1961 | Jenks .................... B01D 9/0018 423/379 |
| 3,619,132 | A | * | 11/1971 | Mann ........................ C01C 3/10 423/371 |
| 4,083,935 | A | | 4/1978 | Makar ........................... 423/379 |
| 4,748,815 | A | | 6/1988 | Junior et al. .................... 60/692 |
| 4,847,062 | A | | 7/1989 | Rogers et al. ................. 423/379 |
| 2006/0246385 | A1 | | 11/2006 | Gaur et al. ......................... 431/5 |
| 2010/0296995 | A1 | | 11/2010 | Allison et al. ................ 423/379 |

FOREIGN PATENT DOCUMENTS

| CN | 102502708 A | 6/2012 | ............... C01C 3/08 |
| CN | 103073027 A | 5/2013 | ............... C01C 3/10 |
| CN | 102502708 B | 11/2013 | ............... C01C 3/08 |
| EP | 0309126 A1 | 3/1989 | ............... C01C 3/10 |

OTHER PUBLICATIONS

Notification Concerning Transmittal of International Preliminary Report on Patentability (Chapter I of the Patent Cooperation Treaty), in English, dated Dec. 28, 2017, which was issued by the International Bureau of WIPO in Applicant's corresponding international PCT application having Serial No. PCT/EP2016/062939, filed on Jun. 8, 2016.
English translation of the International Preliminary Report on Patentability (Chapter I of the Patent Cooperation Treaty), dated Dec. 19, 2017, which was issued by the International Bureau of WIPO in Applicant's corresponding international PCT application having Serial No. PCT/EP2016/062939, filed on Jun. 8, 2016.
Written Opinion of the International Searching Authority, in English, dated Aug. 23, 2016, which was issued by the International Bureau of WIPO in Applicant's corresponding international PCT application having Serial No. PCT/EP2016/062939, filed on Jun. 8, 2016.
International Search Report, in English, dated Aug. 23, 2016, which was issued by the International Bureau of WIPO in Applicant's corresponding international PCT application having Serial No. PCT/EP2016/062939, filed on Jun. 8, 2016.
Notification Concerning Transmittal of International Preliminary Report on Patentability (Chapter I of the Patent Cooperation Treaty), in English, dated Dec. 28, 2017, which was issued by the International Bureau of WIPO in Applicant's related international PCT application having Serial No. PCT/EP2016/062935, filed on Jun. 8, 2016.
English translation of the International Preliminary Report on Patentability (Chapter I of the Patent Cooperation Treaty), dated Dec. 19, 2017, which was issued by the International Bureau of WIPO in Applicant's related international PCT application having Serial No. PCT/EP2016/062935, filed on Jun. 8, 2016.

(Continued)

*Primary Examiner* — Anthony J Zimmer
(74) *Attorney, Agent, or Firm* — Bodner & O'Rourke, LLP; Gerald T. Bodner; Christian P. Bodner

(57) ABSTRACT

The invention relates to a method for producing alkali metal cyanides as solids, comprising the steps: i) an absorption step in the form of the absorption of hydrogen cyanide from a syngas containing hydrogen cyanide in an aqueous alkali metal hydroxide solution; ii) a preparation step for the waste gases containing cyanide that have accumulated in step i); iii) a crystallization step in the form of the introduction of the alkali metal cyanide solution into an evaporative crystallizer; iv) a condensation step for the vapour containing cyanide that has accumulated in step iii) to obtain a vapour condensate containing cyanide; v) a recirculation step, in which the vapour condensate containing cyanide that has been obtained in step iv) is used as an aqueous liquid in step ii).

14 Claims, No Drawings

(56) References Cited

OTHER PUBLICATIONS

Written Opinion of the International Searching Authority, in English, dated Aug. 8, 2016, which was issued by the International Bureau of WIPO in Applicant's related international PCT application having Serial No. PCT/EP2016/062935, filed on Jun. 8, 2016.
International Search Report, in English, dated Aug. 8, 2016, which was issued by the International Bureau of WIPO in Applicant's related international PCT application having Serial No. PCT/EP2016/062935, filed on Jun. 8, 2016.

* cited by examiner

EFFICIENT METHOD FOR DECONTAMINATING WASTE GASES AND WASTE WATER CONTAINING CYANIDE IN A METHOD FOR PRODUCING ALKALI METAL CYANIDES

The present invention relates to a method for producing alkali metal cyanides as solids and alkali metal cyanides produced according to this method.

Alkali metal cyanides have numerous applications. One particularly important area of application is the use for obtaining gold, silver, and other metals in cyanide leaching. Other areas of application are electroplating technology and hardening steel. Alkali metal cyanides also find numerous applications as a starting material in chemical synthesis. One example here is the use for the synthesis of nitriles, which have manifold applications in the chemical industry. One alkali metal cyanide which is particularly technically important is sodium cyanide.

One important method for producing alkali metal cyanides uses the reaction of hydrogen cyanide HCN (hydrocyanic acid) with alkali metal hydroxides. An array of methods has been described in the prior art for the industrial production of HCN as a starting substance for this synthesis of alkali metal cyanides. One particularly frequently used method is the so-called Andrussow method. In the Andrussow method, the production of HCN is performed by catalyzed reaction of methane, ammonia, and air oxygen. In this case, a mixture of ammonia and methane is typically brought to reaction at high temperatures on platinum nets with injection of pure oxygen. The synthesis product produced directly by the Andrussow method represents a mixture of multiple components in this case, wherein in particular unreacted ammonia, hydrogen, nitrogen, and carbon oxides are present in addition to the desired reaction product HCN.

One large problem in the previous methods for producing alkali metal cyanides is the disposal of the cyanide-containing waste gases and wastewater, which always arise. According to the previous methods, it was always necessary to subject a substantial component of the cyanide-containing wastewater arising to complex processing. The decontamination of the cyanide-containing waste gases also always resulted in problems.

According to the methods described in the prior art for producing alkali metal cyanides, a procedure is generally followed in which the HCN-containing reaction gas is liquefied by cooling after the reaction and subsequently the hydrocyanic acid is purified. Complex purification methods, for example, rectification, are necessary for this purpose. The liquid hydrocyanic acid thus purified is then, according to this method from the prior art, brought to reaction with alkali metal hydroxide, typically sodium hydroxide, to obtain sodium cyanide. If the sodium cyanide is to be produced as solids, crystallization thus has to be performed in a further step. To create as little cyanide-containing waste as possible, the sodium cyanide mother liquor can be recirculated after the crystallization into the reaction container in which the liquefied hydrocyanic acid is brought to reaction with sodium hydroxide. However, according to the method described in the prior art, this procedure does not result in a closed loop, since byproducts, for example, sodium formate, become enriched in the course of multiple recirculation cycles, so that after a certain time, the sodium cyanide mother liquor can no longer be recirculated. The sodium cyanide mother liquor thus contaminated by byproducts then has to be disposed of in a costly and environmentally-harmful manner.

This disposal is particularly complex because sodium cyanide and other alkali metal cyanides are highly toxic. In general, the disposal is performed by adding hydrogen peroxide, wherein the sodium cyanide is oxidized to form sodium cyanate. In some circumstances, still further steps are necessary before a final disposal of the detoxified wastewater can be performed. This results in a high cost expenditure.

Alternative embodiments are also described in the prior art, in which the Andrussow reaction gas per se is brought to reaction with a sodium hydroxide solution to produce sodium cyanide. This process control has heretofore only been implemented in a few cases and has heretofore predominantly been used to sell the sodium cyanide solution which results from the reaction of the gas containing hydrocyanic acid with the sodium hydroxide directly as a final product. A method control in which the Andrussow reaction gas is brought to reaction in the gas phase with sodium hydroxide and solid sodium cyanide was produced as a final product has heretofore not been implemented. The reason that such a reaction control has heretofore been implemented rather rarely in the prior art can be seen above all in the difficulty with regard to the contamination of the sodium cyanide mother liquor. Due to the direct reaction of the Andrussow reaction gas in the gas phase with the sodium hydroxide, numerous byproducts arise which either also precipitate as a contaminant during the crystallization of the sodium cyanide or remain as a contaminant in the sodium cyanide mother liquor. These contaminants which remain in the sodium cyanide mother liquor have the result that recirculation of the sodium cyanide mother liquor is only possible to an extremely limited extent, because such a recirculation would result in the further steady enrichment of the byproducts. The byproducts sodium formate and sodium carbonate, which become enriched steadily more strongly in the event of such a recirculation, cause interference in particular. This would make continuous disposal of the sodium cyanide mother liquor necessary, which would result in a low yield of the process, high costs, and an unacceptable environmental strain.

Against this background, the present invention is based on the object of providing a method for producing alkali metal cyanides as solids, which avoids the above-described disadvantages.

In particular, the present invention is based on the object of providing a method for producing alkali metal cyanides, which enables the production of alkali metal cyanides as solids in the fewest possible method steps and at the same time creates as little waste gas and wastewater as possible, in particular in the form of cyanide-containing waste gases and wastewater, which would have to be disposed of in a complex manner.

In addition, the present invention is based on the object of providing a method for producing alkali metal cyanides, which can be carried out as efficiently as possible and produces as little waste gas and wastewater as possible, in particular in the form of cyanide-containing waste gases and wastewater, and at the same time can be carried out independently of the external temperatures prevailing at the plant location.

The object according to the invention is achieved by a method for producing alkali metal cyanide as solids, which comprises the following steps:
  i) an absorption step in the form of an absorption of hydrogen cyanide from a synthesis gas containing hydrogen cyanide in an aqueous alkali metal hydroxide solution to produce an aqueous alkali metal cyanide solution;

ii) a step of processing the cyanide-containing waste gases arising in step i), wherein
   iia) in a first combustion step, the cyanide-containing waste gases arising in step i) are subjected to a sub-stoichiometric combustion (oxygen component in the combustion chamber less than stoichiometrically required);
   iib) in a cooling step, the reaction mixture obtained in step iia) is cooled by introducing an aqueous liquid;
   iic) in a second combustion step, the reaction mixture obtained in step iib) is combusted by supplying further oxygen under super-stoichiometric conditions (oxygen component in the combustion chamber greater than stoichiometrically required);

iii) a crystallization step in the form of introducing the alkali metal cyanide solution into an evaporative crystallizer, which is heated by heating, in particular by steam heating, and in which a pressure below atmospheric pressure (below 1013 mbar) is provided;

iv) a step of condensation of the cyanide-containing vapors arising in step iii) to form a cyanide-containing vapor condensate;

v) a step of recirculation, during which the cyanide-containing vapor condensate obtained in step iv) is used as an aqueous liquid in step iib).

According to the invention, in this case a special interaction of the processing step ii) and the condensation step iv) of the cyanide-containing vapors arising in step iii) is performed.

During the adsorption process described in step i) in the form of the adsorption of hydrogen cyanide from a synthesis gas containing hydrogen cyanide in an aqueous alkali metal hydroxide solution, cyanide-containing waste gases always arise. These cyanide-containing waste gases are disposed of by combustion. To achieve the most complete possible combustion of the cyanide-containing waste gases, a type of combustion is necessary in this case in which as a result oxygen is used in the super-stoichiometric ratio. This is problematic in that in the case of direct use of oxygen in the super-stoichiometric ratio, relatively high quantities of nitrogen oxides arise, which in turn represent a substantial waste gas problem. Therefore, a three-step procedure is selected. In a first step, a sub-stoichiometric combustion is performed, i.e. a combustion, during which the oxygen component in the combustion chamber, typically air oxygen, is less than stoichiometrically required. To suppress the formation of nitrogen oxides in the later performed step of super-stoichiometric combustion, a cooling step is subsequently provided, during which the temperature of the waste gas resulting from the first combustion is reduced by several hundred degrees Celsius. A second combustion step of the reaction mixture thus cooled down is then performed only after this cooling step, by supplying further oxygen, typically air oxygen, under super-stoichiometric conditions.

In the meaning of the present invention, the stoichiometric ratio $\lambda$ is to be defined so that $\lambda=1$ means precisely the quantity of oxygen which is required to completely oxidize the oxidizable components in the waste gas.

To also process the cyanide-containing gases arising in the crystallization step iii), in step iv), a condensation of the cyanide-containing vapors to form a cyanide-containing vapor condensate is performed.

According to the invention, in step v) of the present invention, a recirculation step is provided, during which the cyanide-containing vapor condensate obtained in step iv) is used as an aqueous liquid in the cooling step iib).

It is possible by this procedure to decontaminate both the cyanide-containing waste gases arising in the adsorption step i) and also the cyanide-containing waste gases arising in step iii) in a single processing step.

In one particularly preferred embodiment, an alkali metal cyanide in the form of sodium cyanide is produced by the method according to the invention. In this case, sodium hydroxide (sodium hydroxide solution) is used in step i) as alkali metal hydroxide solution.

A further advantage of the method according to the invention is that in step i), the synthesis gas containing hydrogen cyanide can be used as a non-purified gas mixture directly from an Andrussow process. It is possible by way of the method control according to the invention to bring the HCN-containing gas mixture formed in an Andrussow process directly into reaction with the alkali metal hydroxide solution without any interposed purification step.

The parameters of the processing step ii) are advantageously selected in this case so that the initial combustion in step iia) is carried out at a temperature of approximately 1000 to 1500° C., in particular approximately 1200 to 1400° C., and with a ratio between existing oxygen and stoichiometrically required oxygen ($\lambda$) between approximately 0.75 to 1, in particular approximately 0.8 to 0.9.

By setting these parameters, very efficient combustion of the hydrogen cyanide in the waste gases is achieved with substantial suppression of the formation of nitrogen oxides at the same time.

In this context, the parameters of the cooling step iib) are also important, which are advantageously performed so that a quantity of approximately 100 to 250 L, in particular approximately 150 to 200 L of aqueous liquid is used in relation to 1000 m³ of the gaseous reaction mixture at the injection point, and the temperature is reduced to approximately 800 to 950° C.

This reduction of the temperature of the reaction mixture resulting from the first combustion step before the second, super-stoichiometric combustion step contributes strongly to suppressing the formation of nitrogen oxides.

Particularly good results are achieved if the combustion step ii) is carried out so that the second combustion in step iic) is carried out at a temperature of approximately 700 to <1000° C., in particular approximately 800 to 900° C., and at a ratio between provided oxygen and stoichiometrically required oxygen ($\lambda$) between >1 to 2.5, in particular approximately 1.2 to 2.

Due to the high stoichiometric excess of oxygen in the second combustion step, nearly complete combustion of the hydrogen cyanide present in the waste gas occurs.

The preferred setting of the parameters according to the invention in the crystallization step iii) is also of particular significance.

Fundamentally, in this case due to increasing temperature during the crystallization step in the evaporative crystallizer, the formation of byproducts, in particular in the form of alkali metal formates, is promoted. Under this aspect, the operation is thus to be as cold as possible. However, it is problematic here that at low temperatures, very small alkali metal cyanide crystals form, which are only separable with great difficulty in a later separation step. Due to the interaction according to the invention of the heating in the crystallization step by vapor heating in such a manner that, at the contact surface of the heating element with the alkali metal cyanide solution, a temperature of approximately 60-100° C., preferably approximately 70-90° C. is provided, with a vacuum generation in the crystallization step, so that a pressure of approximately 30-100 mbar, preferably approximately 60-65 mbar is provided, it is possible to sufficiently suppress the formation of byproducts, in particular in the form of formates, and to achieve good crystal sizes simultaneously.

The heating of the crystallization solution in step iii) is typically performed in this case by a pipe bundle heat exchanger, which is heated on the jacket side using steam. Vacuum steam is preferably used in this case, so that temperatures of approximately 70-100° C., typically approximately 70-90° C. are achieved. The formation of byproducts, in particular in the form of formates, can be substantially suppressed by these low temperatures.

Due to the interaction of these method parameters with respect to the heating with the vacuum generation in which a pressure of approximately 30-100 mbar, preferably approximately 60-65 mbar is provided, on the one hand, sufficient crystal sizes are achieved. Crystal sizes of approximately 100-120 μm are desired. Nearly complete separation of the alkali metal cyanides crystallized out of the crystallization solution is thus possible.

At the same time, the formation of byproducts in the faun of formates can be substantially suppressed by this procedure.

In one particularly preferred embodiment of the separation step iii), the evaporative crystallizer is operated so that a pressure of approximately 50 mbar is provided, so that a temperature of approximately 33° C. is necessary for the condensation of the exhaust vapors. Under these conditions, the condensation of the exhaust vapors by coolant water is generally achievable at the external temperatures typically present in the temperate zones. However, problems can occur if an external temperature of greater than 28° C. occurs at least on individual days. This is also entirely possible over a longer period of time in the temperate zones in summer. Of course, the problem is strengthened in the case of plant locations which are in subtropical or tropical zones.

To solve this problem, according to the invention, a method for producing alkali metal cyanide as solids is proposed, which has at least the following steps:
i) an absorption step in the form of an absorption of hydrogen cyanide from a synthesis gas containing hydrogen cyanide in an aqueous alkali metal hydroxide solution to produce an aqueous alkali metal cyanide solution;
iii) a crystallization step in the form of introducing the alkali metal cyanide solution into an evaporative crystallizer, which is heated by heating, in particular by steam heating, and in which a pressure below atmospheric pressure (below 1013 mbar) is provided;
iv) a step of condensation of the cyanide-containing vapors arising in step iii) to form a cyanide-containing vapor condensate; wherein the step of the condensation iv) is performed using a multistage steam jet compressor, which suctions the exhaust vapors out of the crystallizer.

Due to the use of a steam jet compressor, which suctions the exhaust vapors out of the crystallizer, it is possible to make the condensation step independent of the external temperature.

It is particularly preferable to combine this procedure using a steam jet compressor for condensation of the cyanide-containing vapors arising in step iii) with the procedure described above of the combination of the processing step ii) and the recirculation step v).

In one particularly preferred embodiment, the method according to the invention is therefore embodied so that it comprises the following steps:
i) an absorption step in the form of an absorption of hydrogen cyanide from a synthesis gas containing hydrogen cyanide in an aqueous alkali metal hydroxide solution to produce an aqueous alkali metal cyanide solution;
ii) a step of processing the cyanide-containing waste gases arising in step i), wherein
  iia) in a first combustion step, the cyanide-containing waste gases arising in step i) are subjected to a sub-stoichiometric combustion (oxygen component in the combustion chamber less than stoichiometrically required);
  iib) in a cooling step, the reaction mixture obtained in step iia) is cooled by introducing an aqueous liquid;
  iic) in a second combustion step, the reaction mixture obtained in step iib) is combusted by supplying further oxygen under super-stoichiometric conditions (oxygen component in the combustion chamber greater than stoichiometrically required);
iii) a crystallization step in the form of introducing the alkali metal cyanide solution into an evaporative crystallizer, which is heated by heating, in particular by steam heating, and in which a pressure below atmospheric pressure (below 1013 mbar) is provided;
iv) a step of condensation of the cyanide-containing vapors arising in step iii) to form a cyanide-containing vapor condensate, wherein the step of the condensation iv) is performed using a multistage steam jet compressor, which suctions the exhaust vapors out of the crystallizer;
v) a step of recirculation, during which the cyanide-containing vapor condensate obtained in step iv) is used as an aqueous liquid in step iib).

A synergistic cooperation of the method control results here, since due to the use of the steam jet compressor in step iv), the cyanide-containing vapor condensate from the crystallization step iii) can be removed particularly efficiently and independently of the external temperature and can be combusted simultaneously in the step ii) with the waste gas containing hydrogen cyanide arising in step i), wherein the vapor condensate obtained in step iv) is simultaneously used as an aqueous liquid in the cooling step iib).

Particularly good results are achieved if the steam jet compressor is used in such a way that the compression ratio over all stages is approximately 1:33 to 1:10, in particular approximately 1:16 to 1:15, particularly preferably approximately 1:15.5.

The method is particularly advantageously carried out so that the steps ii) and iv) represent a closed loop with respect to the cyanide-containing vapor condensate obtained in step iv), during which no cyanide-containing vapor condensate has to be discarded.

In one particularly preferred embodiment, the method according to the invention also comprises at least one of the following steps:
iiib) a separation step in the form of the separation of the alkali metal cyanide crystals formed from the mother liquor, in particular by centrifuging;
iiic) a recirculation step in the form of the recirculation of approximately X vol.-% of the mother liquor separated in step iiib) into the absorption according to step i) and the recirculation of (100-X) vol.-% of the mother liquor separated in step iiib) into the crystallization according to step iii);

iiid) a drying step in the form of the drying of the alkali metal cyanide crystals separated in step iiib);

iiie) a pulverization step in the form of the pulverization of the alkali metal cyanide crystal flow obtained in step iiid).

The separation step iiib) is used in this case to separate the alkali metal cyanide crystals obtained in the crystallization step from the mother liquor. In one particularly preferred embodiment, this separation is performed by one or more centrifuges, in particular in the form of peeler centrifuges.

The recirculation step iiic) enables the complete recirculation of the mother liquor containing alkali metal cyanide, which is separated in the separation step iiib), into the process. In this case, the one part of X vol.-% of the mother liquor separated in step iiib) is recirculated into the absorption and the other part (100-X) vol.-% of the separated mother liquor is recirculated into the crystallization.

Overall, according to this embodiment, a complete recirculation of the mother liquor separated in the separation step iiib) thus occurs, wherein the component X vol.-% is recirculated into the absorption step i) and the remaining component (100-X) vol.-% is recirculated into the crystallization step iii). Surprisingly, it has been shown that due to this divided manner of the recirculation of the mother liquor obtained in step iiib), in synergistic cooperation with further features of the method according to the invention, a completely closed loop can be achieved, in which no mother liquor containing alkali metal cyanide has to be disposed of.

The setting of the parameters according to the invention in the crystallization step iii) is of particular significance in this case.

Fundamentally, in this case due to increasing temperature during the crystallization step in the evaporative crystallizer, the formation of byproducts, in particular in the form of alkali metal formates, is promoted. Under this aspect, the operation is thus to be as cold as possible. However, it is problematic here that at low temperatures, very small alkali metal cyanide crystals form, which are only separable with great difficulty in the separation step iiib). Due to the cooperation according to the invention of the heating in the crystallization step by vapor heating in such a manner that, at the contact surface of the heating element with the alkali metal cyanide solution, a temperature of approximately 60-100° C., preferably approximately 70-90° C. is provided, with a vacuum generation in the crystallization step, so that a pressure of approximately 30-100 mbar, preferably approximately 60-65 mbar is provided, it is possible to sufficiently suppress the formation of byproducts, in particular in the form of formates, and to achieve good crystal sizes simultaneously.

The heating of the crystallization solution in step iii) is typically performed in this case by a pipe bundle heat exchanger, which is heated on the jacket side using steam. Vacuum steam is preferably used in this case, so that temperatures of approximately 70-100° C., typically approximately 70-90° C. are achieved. The formation of byproducts, in particular in the form of formates, can be substantially suppressed by these low temperatures.

Due to the cooperation of these method parameters with respect to the heating with the vacuum generation in which a pressure of approximately 30-100 mbar, preferably approximately 60-65 mbar is provided, on the one hand, sufficient crystal sizes are achieved. Crystal sizes of approximately 100-120 µm are desired. Nearly complete separation of the alkali metal cyanides crystallized out of the crystallization solution is thus possible.

At the same time, the formation of byproducts in the form of formates can be suppressed sufficiently, so that in cooperation with the procedure according to the invention of the partial recirculation of the mother liquor separated in step iiib) into the absorption (step i)) and recirculation of the remaining part of the mother liquor into the crystallization (step iii)), it is thus possible for the first time to produce a closed loop of the alkali metal cyanide solution. The method according to the invention therefore enables, according to this aspect, the production of alkali metal cyanide as solids in good quality with only minor contaminants, wherein at the same time no wastewater containing alkali metal cyanide results, which would have to be disposed of in a costly and environmentally-harmful manner.

The drying step iiid) is used for drying the alkali metal cyanide crystals separated in step iiib). Various drying techniques can be used in this case.

The pulverization step iiie) is used for pulverizing compactions of the alkali metal cyanide crystal flow. Such a pulverization of compactions is advantageous, because it greatly facilitates subsequent briquetting of the product.

In one preferred embodiment, the method according to the invention is carried out so that after step iii), a further step iiib) is performed in the form of a separation step in the faun of the separation of the alkali metal cyanide crystals formed from the mother liquor by centrifuging, in particular by means of discontinuously operating peeler centrifuges.

The method is particularly preferably carried out so that after the separation step iiib), a further step iiic) is performed as a recirculation step in the form of the recirculation of approximately X vol.-% of the mother liquor separated in the step iiib) into the absorption according to step i) and the recirculation of approximately (100-X) vol.-% of the mother liquor separated in step iiib) into the crystallization according to step iii).

Due to this step according to the invention of the partial recirculation of the alkali cyanide mother liquor into the adsorption process and simultaneously the partial recirculation of the remaining component of the mother liquor separated in separation step iii) into the crystallization, a closed loop is also achieved with respect to the separated mother liquor.

Overall, complete recirculation of the mother liquor separated in the separation step iiib) is thus performed, wherein the component X vol.-% is recirculated into the absorption step i) and the remaining component (100-X) vol.-% is recirculated into the crystallization step iii). Surprisingly, it has been shown that due to this divided manner of the recirculation of the mother liquor obtained in step iiib), in synergistic cooperation with further features of the method according to the invention, a completely closed loop can be achieved, in which no mother liquor containing alkali metal cyanide has to be disposed of.

In this case, the preferred cooperation according to the invention of carrying out the crystallization step iii) using the special parameters with respect to the temperature of the steam heating and the pressure provided in the evaporative crystallizer with the procedure according to the invention of the partial recirculation of the mother liquor separated in step iiib) into the absorption (step i) and recirculation of the remaining part of the mother liquor into the crystallization (step iii)) is of particular significance. It is possible for the first time by way of this procedure to produce a closed loop of the alkali metal cyanide solution. The method according to the invention therefore enables the production of alkali metal cyanide as solids in good quality with only minor contaminants, wherein at the same time no wastewater containing alkali metal cyanide results, which would have to be disposed of in a costly and environmentally-harmful manner.

At the same time, the preferred cooperation according to the invention of the processing step ii) with the step of obtaining the cyanide-containing vapor condensate iv), in particular in cooperation with the use of a multistage steam jet compressor, enables a closed loop with respect to the cyanide-containing waste gases.

To enable a method control which makes the alkali metal cyanide accessible as solids in the highest possible yield and the highest possible purity, in step i), the alkali metal hydroxide is preferably continuously measured and regulated, so that the optimum concentration of the alkali metal hydroxide is always provided. Due to this continuous measurement and regulation, it is possible to always keep the content of free alkali metal hydroxide in the solution in the desired range of approximately 2-10 wt.-%.

In one preferred embodiment, the drying step iiid) of the drying of the alkali metal cyanide crystals separated in step iiib) is performed so that the drying is performed in a contact dryer having forced circulation at a temperature of the heating medium of approximately 180-400° C., preferably approximately 185-250° C.

Particularly good results are achieved in this case if the alkali metal cyanide crystals separated in step iiib) pass through an upstream preheater before the drying step iiid) and in this case evening out of the discontinuous product flow between the peeler centrifuges and the contact dryer is achieved simultaneously.

The interaction of dryer and preheater is preferably designed in this case so that dryer and preheater are flushed with a preheated airflow such that targeted air guiding from the outside to the inside and from dry to damp occurs.

A further special advantage of the method according to the invention is that in step i), a synthesis gas containing hydrogen cyanide can be used, for the production of which natural gas having a methane content of <approximately 98 mass-% can be used without special prior purification for the Andrussow process. The reaction product of the Andrussow process which was produced from a natural gas thus used having a methane content of <approximately 98 mass-% can be used directly for absorption in step i) without intermediate purification steps.

In one preferred embodiment of the method according to the invention, the step iiid) is followed by a further step iiie) in the form of a pulverization step, wherein a setting of the maximum size of approximately 10 mm for optimizing the subsequent briquetting is performed for pulverizing compactions of the alkali metal cyanide crystal flow from step iiid).

The present invention also relates to an alkali metal cyanide, in particular in the form of sodium cyanide, which is produced according to the method according to the invention.

The method according to the invention has numerous advantages in relation to the previous methods for producing alkali metal cyanides. On the one hand, it is possible by way of the synergistic interaction of the method parameters to achieve a closed loop with respect to the cyanide-containing vapors arising in the method. This is performed in a particularly efficient manner, since the cyanide-containing vapors arising during the crystallization can be disposed of jointly with the cyanide-containing waste gases arising in the absorption process and can be used simultaneously as a coolant liquid. A closed loop can also be achieved with respect to the cyanide-containing mother liquor arising in the crystallization by the method control according to the invention. At the same time, it is possible by way of the method according to the invention to bring the synthesis gas containing hydrogen cyanide directly into reaction with the alkali metal hydroxide solution, without any condensation and purification step. This results in substantially simpler method control and the savings of cost.

The invention claimed is:

1. A method for producing alkali metal cyanides as solids, comprising the following steps:
   i) an absorption step, in which hydrogen cyanide from a synthesis gas containing hydrogen cyanide is absorbed in an aqueous alkali metal hydroxide solution to produce an aqueous alkali metal cyanide solution, wherein cyanide-containing waste gases arise from the absorption step;
   ii) a step of processing the cyanide-containing waste gases arising in step i), wherein
      iia) in a first combustion step, the cyanide-containing waste gases arising in step i) are subjected to a sub-stoichiometric combustion, in the sub-stoichiometric combustion the oxygen component in the combustion chamber being less than stoichiometrically required;
      iib) in a cooling step, a reaction mixture obtained in step iia) is cooled by introducing an aqueous liquid;
      iic) in a second combustion step, a reaction mixture obtained in step iib) is combusted by supplying further oxygen under super-stoichiometric conditions, in the super-stoichiometric conditions the oxygen component in the combustion chamber being greater than stoichiometrically required;
   iii) a crystallization step, in which the alkali metal cyanide solution is introduced into an evaporative crystallizer, which is heated by heating and in which a pressure below 1013 mbar is provided, wherein cyanide-containing vapors arise from the crystallization step;
   iv) a step of condensation of the cyanide-containing vapors arising in step iii) to form a cyanide-containing vapor condensate;
   v) a step of recirculation, during which the cyanide-containing vapor condensate obtained in step iv) is used as an aqueous liquid in step iib).

2. The method according to claim 1, characterized in that sodium cyanide is formed as the alkali metal cyanide.

3. The method according to claim 1, characterized in that a non-purified gas mixture from an Andrussow process is used as the hydrogen cyanide synthesis gas.

4. The method according to claim 1, characterized in that the initial combustion in step iia) is carried out at a temperature of approximately 1000 to 1500° C. and at a ratio between existing oxygen and stoichiometrically required oxygen ($\lambda$) between 0.75 to 1.

5. The method according to claim 1, characterized in that in the cooling step iib), a quantity of approximately 100 to 250 L of aqueous liquid is used in relation to 1000 m$^3$ of the gaseous reaction mixture at the injection point and the temperature is reduced to approximately 800 to 950° C.

6. The method according to claim 1, characterized in that the second combustion in step iic) is carried out at a temperature of approximately 700 to <1000° C. and at a ratio between provided oxygen and stoichiometrically required oxygen ($\lambda$) between >1 to 2.5.

7. The method according to claim 1, characterized in that the crystallization step iii) is carried out so that the evaporative crystallizer is heated by steam heating so that a temperature of approximately 60 to 100° C. is provided at the contact surface of the heating element to the alkali metal cyanide solution and a pressure of approximately 30 to 100 mbar is provided.

8. The method according to claim 4, characterized in that the initial combustion in step iia) is carried out at a temperature of approximately 1200 to 1400° C.

9. The method according to claim 4, characterized in that the initial combustion in step iia) is carried out at a ratio between existing oxygen and stoichiometrically required oxygen ($\lambda$) between 0.8 to 0.9.

10. The method according to claim 5, characterized in that in the cooling step iib), a quantity of approximately 150 to 200 L of aqueous liquid is used in relation to 1000 m$^3$ of the gaseous reaction mixture at the injection point.

11. The method according to claim 6, characterized in that the second combustion in step iic) is carried out at a temperature of approximately 800 to 900° C.

12. The method according to claim 6, characterized in that the second combustion in step iic) is carried out at a ratio between provided oxygen and stoichiometrically required oxygen ($\lambda$) between >1.2 to 2.

13. The method according to claim 7, characterized in that the crystallization step iii) is carried out so that the evaporative crystallizer is heated by steam heating so that a temperature of approximately 70 to 90° C. is provided at the contact surface of the heating element to the alkali metal cyanide solution.

14. The method according to claim 7, characterized in that the crystallization step iii) is carried out so that a pressure of approximately 60 to 65 mbar is provided.

* * * * *

UNITED STATES PATENT AND TRADEMARK OFFICE
CERTIFICATE OF CORRECTION

PATENT NO. : 10,730,758 B2  
APPLICATION NO. : 15/575624  
DATED : August 4, 2020  
INVENTOR(S) : Henkel et al.

Page 1 of 1

It is certified that error appears in the above-identified patent and that said Letters Patent is hereby corrected as shown below:

On the Title Page

Item (72), Inventors should read:
-- Jens Henkel, Meuselbach-Schwarzmuhle (DE); Jurgen Rassbach, Arnstadt (DE); Klaus Trenkmann, Rudolstadt (DE); Markus Jafeld, Frechen (DE); Bernd Glockler, Bruchkobel (DE) --

Signed and Sealed this  
Twelfth Day of October, 2021

Drew Hirshfeld  
*Performing the Functions and Duties of the*  
*Under Secretary of Commerce for Intellectual Property and*  
*Director of the United States Patent and Trademark Office*

UNITED STATES PATENT AND TRADEMARK OFFICE
CERTIFICATE OF CORRECTION

PATENT NO. : 10,730,758 B2
APPLICATION NO. : 15/575624
DATED : August 4, 2020
INVENTOR(S) : Henkel et al.

Page 1 of 1

It is certified that error appears in the above-identified patent and that said Letters Patent is hereby corrected as shown below:

On the Title Page

Item (72), Inventors should read:
-- Jens Henkel, Meuselbach-Schwarzmuhle (DE); Jurgen Rassbach, Amstadt (DE); Klaus Trenkmann, Rudolstadt (DE); Markus Jafeld, Frechen (DE); Bernd Glöckler, Bruchköbel (DE) --

This certificate supersedes the Certificate of Correction issued October 12, 2021.

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*